(12) United States Patent   (10) Patent No.: US 8,016,648 B2
Frederick   (45) Date of Patent: Sep. 13, 2011

(54) SQUIRREL SKINNER AND METHOD

(75) Inventor: Kelly Frederick, Walker, LA (US)

(73) Assignee: Frederick Technology Firm, LLC, Prairieville, LA (US)

( * ) Notice: Subject to any disclaimer, the term of this patent is extended or adjusted under 35 U.S.C. 154(b) by 105 days.

(21) Appl. No.: 12/536,446

(22) Filed: Aug. 5, 2009

(65) Prior Publication Data

US 2011/0034116 A1   Feb. 10, 2011

(51) Int. Cl.
*A22B 5/16* (2006.01)
(52) U.S. Cl. ....................................................... 452/132
(58) Field of Classification Search .................. 452/185, 452/186, 194–196, 198, 132; 43/65, 21.2, 43/25, 17.2; 269/54, 296, 302.1, 289, 292–294, 269/900, 53, 54.1–54.5; 211/13.1, 85.4, 211/85.7, 85.11
See application file for complete search history.

(56) References Cited

U.S. PATENT DOCUMENTS

| 2,066,822 | A | * | 1/1937 | Cohen | 211/13.1 |
| 4,543,688 | A | * | 10/1985 | Barchus | 452/187 |
| 4,615,077 | A | * | 10/1986 | Beebe | 452/187 |
| 4,625,363 | A | * | 12/1986 | Watson | 452/187 |
| 6,138,841 | A | * | 10/2000 | Klein et al. | 211/85.7 |
| 6,409,588 | B1 | * | 6/2002 | Womack et al. | 452/187 |
| 6,565,426 | B2 | * | 5/2003 | Mayhew | 452/185 |
| 6,643,973 | B1 | * | 11/2003 | Smith | 43/21.2 |

* cited by examiner

*Primary Examiner* — Thomas Price
(74) *Attorney, Agent, or Firm* — nolaIP, LLC; Neil J. Coig

(57) ABSTRACT

The invention is a method and apparatus for quicker, easier and more injury-free skinning of small to medium size game utilizing a dual fish skinner in conjunction with game skinning attachment, whose spike provides support and accessibility.

4 Claims, 2 Drawing Sheets

SQUIRREL SKINNER AND METHOD

BACKGROUND OF THE INVENTION

The present invention relates to a method and apparatus for skinning small to medium game, particularly squirrel. Squirrel is a common name applied to members of the rodent family Sciuridae, classified in the phylum Chordata, subphylum Vertebrata, class Mammalia, order Rodentia, suborder Sciuromorpha.

Squirrels and other small mammals must be skinned in order to obtain the meat, or product, therein. Traditionally, a squirrel is placed on the ground and the head is secured with a free hand, while the other hand attempts to make incisions to remove the skin. The body of the squirrel is free to move as incisions are made to remove the skin, and often requires a foot, or another person, to be used to further stabilize the game by securing the tail or posterior. Bending and folding over, while using three limbs, is a cumbersome process, and skinning the game on the ground risks soiling the meat when introduced to the ground.

Alternatively, the head of the squirrel may be secured by nailing it to a stationary object, such as a board or tree. Unfortunately, when utilizing this method, a portion of the squirrel is concealed, as it is positioned against the stationary object. This, in turn, requires additional handling and repositioning to remove the skin. Skinning a squirrel is challenging, as it must be properly secured to provide both stability and tension to the squirrel, which allows for more precise, safe, and effective incisions. Often, the squirrel slides along the nail or attachment points as incisions are being made, thus rendering the exercise more fraught with danger and inconvenience.

Obvious downsides exist in the current method of skinning squirrel, as are described above. The consequences of these skinning methods are increased injuries associated with the skinning, reduced productivity, and a poorly executed skin removal, all of which lead to an increased need for a revised method and apparatus with minimized cost and complexity, which the present invention addresses.

The present invention of a skinning apparatus and method is thus a much-improved mode of handling the skinning process, since it enables a person seeking to skin squirrel the ability to skin the animal while it remains fixed in a comfortable location, freeing up a hand to provide additional support and work. Utilizing the current invention, the entire process can be accomplished in a safe and effective manner, without repositioning the animal from its initial position.

OBJECTS OF THE INVENTION

One object of the invention is to provide a method for skinning small to medium sized game.

Another object of this invention is to provide an apparatus for skinning small to medium sized game.

Yet another object of this invention is to provide an apparatus for skinning small to medium sized game with a reduced injury occurrence.

Still another object of this invention is to provide an apparatus which provides a quicker method of skinning small to medium sized game.

Other objects and advantages of this invention shall become apparent from the ensuing descriptions of the invention.

SUMMARY OF THE INVENTION

According to the present invention, a method and apparatus for quicker, easier and more injury-free skinning of small to medium sized game utilizing a dual fish skinner apparatus in conjunction with a game skinning attachment, which includes a spike to provide support and accessibility, is disclosed.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
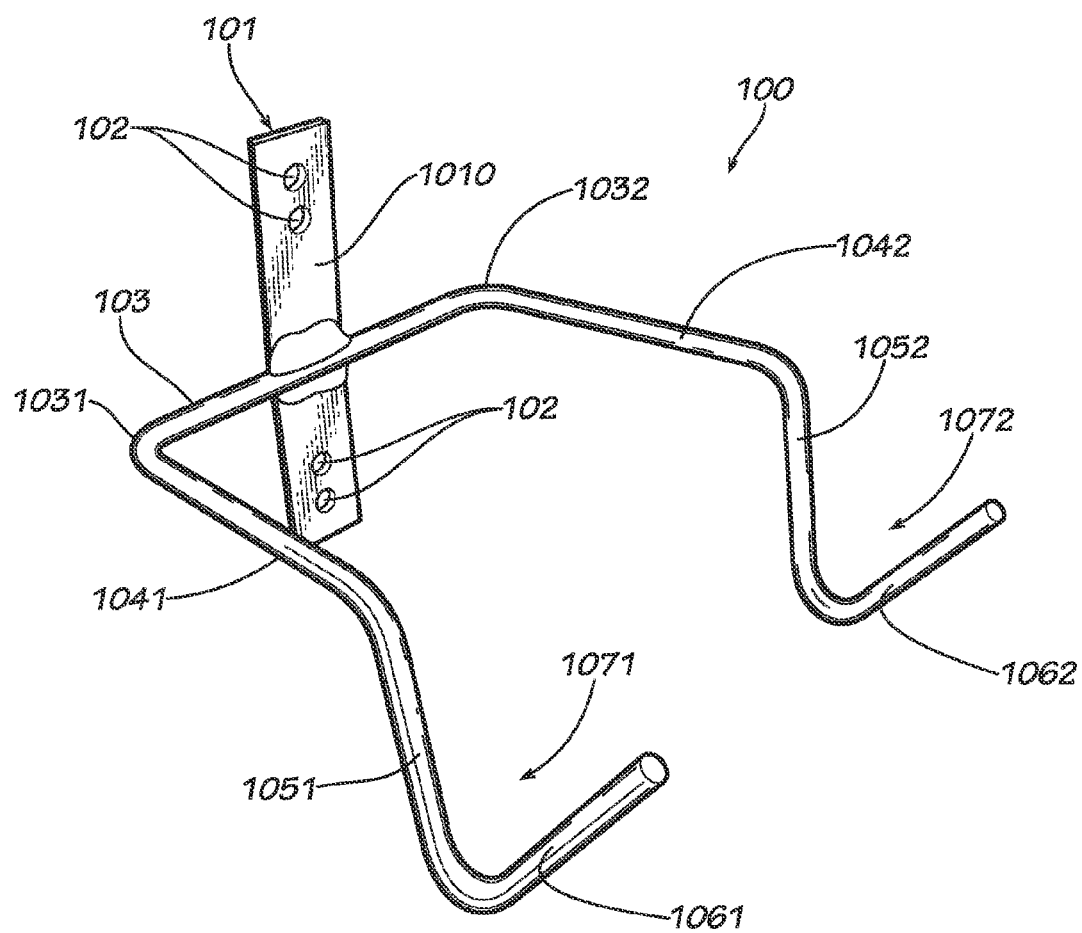
FIG. 1 is a perspective view of the dual fish skinner.
Figure 3:
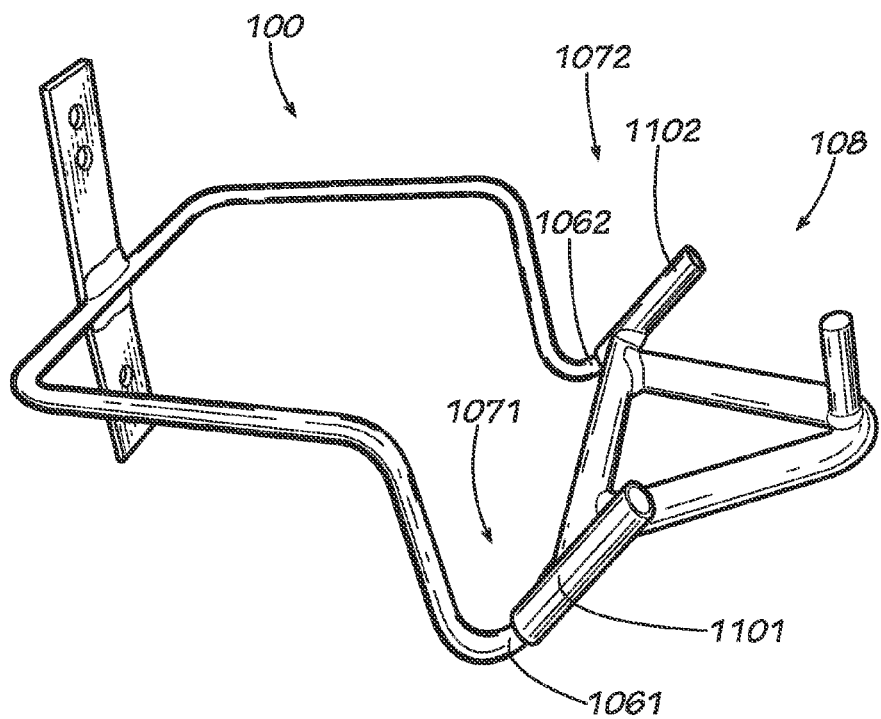
FIG. 3 is a perspective view of the game skinning attachment affixably attached to the dual fish skinner.
Figure 2:
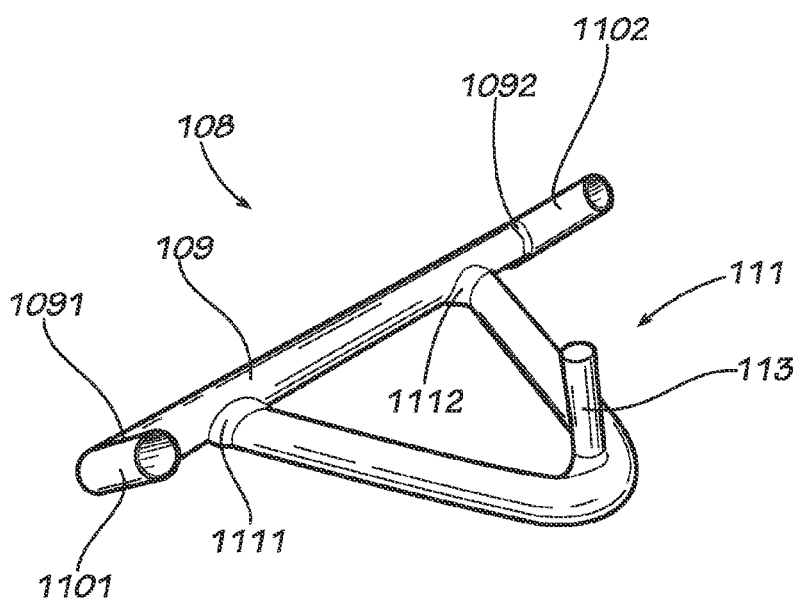
FIG. 2 is a perspective view of the game skinning attachment.

Without any intent to limit the scope of this invention, reference is made to the figures in describing the various embodiments of the invention. FIGS. 1-3 show various aspects of exemplary embodiments of the present invention. The present invention relates to an apparatus and method for skinning squirrel.

FIG. 1 depicts the skinning apparatus 100 having mounting base 101 for mounting to a surface, such as a tree, pole, wall or other object using securing devices 102 such as bolts, screws or nails. Generally, the face 1010 of mounting base 101 would be perpendicular to the surface below the user's feet, and substantially flat, however this is not required. From face 1010 of mounting base 101 bilaterally extends main support 103, which is substantially parallel to the face 1010 of mounting base 101, and has first opposite end 1031 and second opposite end 1032. Operatively connected to said first opposite end 1031 at an angle between forty-five degrees and one hundred thirty-five degrees relative to main support 103 is first secondary support 1041, which extends away from and is substantially perpendicular to face 1010 of mounting base 101. Operatively connected to said second opposite end 1032 at an angle between forty-five degrees and one hundred thirty-five degrees relative to main support 103 is second secondary support 1042, which extends away from and is substantially perpendicular to face 1010 of mounting base 101. An exemplary embodiment of first secondary support 1041 and second secondary support 1042 would both have an angle of ninety degrees relative to main support 103, positioning first secondary support 1041 and second secondary support 1042 parallel to each other and perpendicular to face 1010 of mounting base 101.

A first leg 1051 is operatively connected to first secondary support 1041 and extending downward at an angle between seventy-five degrees and one hundred twenty degrees relative to first secondary support 1041. A second leg 1052 is operatively connected to second secondary support 1042 and extending downward at an angle between seventy-five degrees and one hundred twenty degrees relative to second secondary support 1042. An exemplary embodiment of first leg 1051 and second leg 1052 would both have an angle of one hundred degrees relative to first secondary support 1041 and second secondary support 1042 respectively, both extending downward and parallel to each other.

A first arm 1061 is operatively connected to first leg 1051 at an angle between twenty degrees and eighty degrees relative to first leg 1051 and is angled upward and away from first leg 1051, wherein first leg 1051 and first arm 1061 form a first wedge 1071. A second arm 1062 is operatively connected to second leg 1052 at an angle between twenty degrees and eighty degrees relative to second leg 1052 and is angled upward and away from second leg 1052, wherein second leg 1052 and second arm 1062 form a second wedge 1072. An exemplary embodiment of first wedge 1071 and second wedge 1072 would both be approximately fifty-five degrees and parallel to each other. A portion or all of the dual fish skinner 100 can also be textured to add additional gripping properties if desired. Additionally, a barb or noose can be added to spike 113.

FIG. 2 depicts game skinning attachment 108 having ring support beam 109 with first polar end 1091 and second polar end 1092 and extending a distance approximately equal to the distance between first arm 1061 and second arm 1062. A first ring 1101 is attached to first polar end 1091 wherein an aperture formed by first ring 1101 is sized to affixably attach onto first arm 1061. A second ring 1102 is attached to second polar end 1092 wherein an aperture formed by second ring 1102 is sized to affixably attach onto second arm 1062. Ring support beam 109 is further comprised of a game mounting extension 111, which is attached to at least two points between first polar end 1091 and second polar end 1092, being positioned in a substantially perpendicular configuration to face 1010 of mounting base 101, and extending away from face 1010 of mounting base 101. An exemplary embodiment of game mounting extension 111 would be an equilateral triangle centered medially on ring support beam 109, attached at first point 1111 and second point 1112. A spike 113 is operatively attached to game mounting extension 111 and configured at an angle between thirty degrees and eighty degrees to game mounting extension 111 and is angled upward and towards face 1010 of mounting base 101. An exemplary embodiment of spike 113 would be approximately at a sixty-five degree angle to game mounting extension. A portion or all of the game skinning attachment 108 can also be textured to add additional gripping properties if desired.

FIG. 3 depicts the game skinning attachment 108 connected to the skinning apparatus 100, which is properly secured by affixably attaching first ring 1101 onto first arm 1061 and second ring 1102 onto second arm 1062 so that spike 113 is facing upwards and towards face 1010 of mounting base 101.

In operation, game 114 is placed on game skinning attachment 108 by placing spike 113 on the underside of the jaw 115 of game 114 and forcing the spike 114 through the skin of game 114 until the jaw is firmly resting on and within game mounting extension 111. In this way, game 114 will be firmly secured and suspended. After further stabilize the game by providing downward tension from the posterior, an incision is made through the upper portion of the spine 115 of game 114. This incision is then elongated laterally in both directions. Lastly, using hands or pliers, the skin of game is gripped below and near the initial spinal incision and pulled downward, thereby removing the greater portion of the skin of the game 114 and revealing the meat or product. Thus, a quicker, safer, easier skinning has been performed.

It should be noted that though squirrel have been recited as the animal to be skinned herein, any suitable animal having similar physical characteristics that could benefit from this apparatus or method should be construed as being able to employ and take advantage of the present invention. Such other species include rabbit, nutria, gopher, chipmunk, prairie dogs, chinchilla, mink and the like. The invention can be resized to fit the appropriate species as needed, so long as the proportions remain the same.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. An apparatus for skinning small to medium size game comprising:
   a. a mounting base configured to attach to a stationary object;
   b. a main support, having first and second opposite ends, operatively connected to the face of said mounting base, being positioned substantially parallel to said face of said mounting base;
   c. a first secondary support operatively connected to said first opposite end of said main support wherein said first secondary support is at an angle between forty-five degrees and one hundred thirty-five degrees relative to said main support, extending away from and substantially perpendicular to said face of said mounting base;
   d. a second secondary support operatively connected to said second opposite end of said main support wherein said second secondary support is at an angle between forty-five degrees and one hundred thirty-five degrees relative to said main support, extending away from and substantially perpendicular to said face of said mounting base;
   e. a first leg operatively connected to said first secondary support and extending downward at an angle between seventy-five degrees and one hundred twenty degrees relative to said first secondary support;
   f. a second leg operatively connected to said second secondary support and extending downward at an angle between seventy-five degrees and one hundred twenty degrees relative to said second secondary support;
   g. a first arm operatively connected to said first leg at an angle between twenty degrees and eighty degrees relative to said first leg and is angled upward and away from said first leg, wherein said first leg and said first arm form a first wedge;
   h. a second arm operatively connected to said second leg at an angle between twenty degrees and eighty degrees relative to said second leg and is angled upward and away from said second leg, wherein said second leg and said second arm form a second wedge; and
   i. a detachable game skinning attachment comprising:
      i. a ring support beam having first and second polar ends operatively extending between said first arm and said second arm;
      ii. a first ring attached to said first polar end of said ring support beam, wherein an aperture formed by said first ring is sized to affixably attach onto said first arm;
      iii. a second ring attached to said second polar end of said ring support beam, wherein an aperture formed by said second ring is sized to affixably attach onto said second arm;
      iv. said support beam further comprising a game mounting extension attached at least at two points between said first polar end and said second polar end and positioned in a substantially perpendicular configuration to said face of said mounting base and extending away from said mounting base; and
      v. a spike operatively attached to said game mounting extension which is configured at an angle between thirty degrees and eighty degrees to said game mounting extension and is angled upward and towards said face of said mounting base.

2. The apparatus for skinning small to medium size game of claim 1 wherein said small to medium size game skinning device is textured.

3. A method of skinning small to medium size game using the apparatus described in claim 1 comprising:
   a. securing said game by positioning head of said game facing said face of said mounting base and pushing head onto said spike so that spike punctures through underside of jaw of said game, effectively securing said game;
   b. providing tension and further stabilizing said game by using hand to pull posterior of said game in a downward direction;
   c. utilizing a sharp object for making an incision at the upper portion of the spine of said game;
   d. elongating said incision laterally in both directions; and
   e. gripping the skin below and near the initial spinal decision, the skin is pulled off in a downward motion, leaving the skinned game remaining on said spike.

4. A detachable game skinning attachment comprising:
   i. a ring support beam having first and second polar ends operatively extending between said first arm and said second arm;
   ii. a first ring attached to said first polar end of said ring support beam, wherein an aperture formed by said first ring is sized to affixably attach onto said first arm;
   iii. a second ring attached to said second polar end of said ring support beam, wherein an aperture formed by said second ring is sized to affixably attach onto said second arm;
   iv. said support beam further comprising a game mounting extension attached at least at two points between said first polar end and said second polar end and positioned in a substantially perpendicular configuration to said face of said mounting base and extending away from said mounting base; and
   v. a spike operatively attached to said game mounting extension which is configured at an angle between thirty degrees and eighty degrees to said game mounting extension and is angled upward and towards said face of said mounting base.

* * * * *